(12) United States Patent
Collins et al.

(10) Patent No.: US 7,113,183 B1
(45) Date of Patent: Sep. 26, 2006

(54) METHODS AND SYSTEMS FOR REAL-TIME, INTERACTIVE IMAGE COMPOSITION

(75) Inventors: Scott Collins, Boulder, CO (US);
Justin Ebert, Boulder, CO (US);
Mattias Fornander, Boulder, CO (US);
Daniel Cook, Boulder, CO (US)

(73) Assignee: Anark Corporation, Boulder, CO (US)

( * ) Notice: Subject to any disclaimer, the term of this patent is extended or adjusted under 35 U.S.C. 154(b) by 205 days.

(21) Appl. No.: 10/134,022

(22) Filed: Apr. 25, 2002

(51) Int. Cl.
*G06T 17/00* (2006.01)

(52) U.S. Cl. .................................. 345/419

(58) Field of Classification Search ............... 345/419, 345/420, 421, 422, 423, 424, 473, 474, 475, 345/4, 5, 6; 348/445, 722; 709/302
See application file for complete search history.

(56) References Cited

U.S. PATENT DOCUMENTS

| | | |
|---|---|---|
| 4,538,188 A | 8/1985 | Barker et al. |
| 4,845,651 A | 7/1989 | Aizawa et al. |
| 4,982,343 A | 1/1991 | Hourvitz et al. |
| 5,151,998 A | 9/1992 | Cappe |
| 5,204,969 A | 4/1993 | Capps et al. |
| 5,434,959 A | 7/1995 | Von Her, II et al. |
| 5,467,443 A | 11/1995 | Johnson et al. |
| 5,469,274 A | 11/1995 | Iwasaki et al. |
| 5,477,337 A | 12/1995 | Schuler |
| 5,500,927 A | 3/1996 | Sander-Cederlof et al. |
| 5,517,320 A | 5/1996 | Schuler |
| 5,532,830 A | 7/1996 | Schuler |
| 5,583,974 A | 12/1996 | Winner et al. |
| 5,592,602 A | 1/1997 | Edmunds et al. |
| 5,594,855 A | 1/1997 | Von Her, II et al. |
| 5,623,593 A | 4/1997 | Spells, III |
| 5,680,639 A | 10/1997 | Milne et al. |
| 5,751,281 A | 5/1998 | Hoddie et al. |
| 5,764,241 A | 6/1998 | Elliott et al. |
| 5,808,610 A | 9/1998 | Benson et al. |
| 5,874,967 A | 2/1999 | West et al. |
| 5,920,687 A | 7/1999 | Winner et al. |
| 5,940,080 A | 8/1999 | Ruehle et al. |
| 6,008,820 A | 12/1999 | Chauvin et al. |
| 6,028,583 A | 2/2000 | Hamburg |
| 6,044,408 A * | 3/2000 | Engstrom et al. ........... 719/328 |
| 6,076,104 A | 6/2000 | McCue |
| 6,083,162 A | 7/2000 | Vining |
| 6,084,590 A | 7/2000 | Robotham et al. |
| 6,088,027 A | 7/2000 | Konar et al. |
| 6,088,035 A | 7/2000 | Sudarsky et al. |
| 8,084,590 | 7/2000 | Robotham et al. |

(Continued)

OTHER PUBLICATIONS

Marrin et al., Steerable Media: Interactive Television via Video Synthesis, Feb. 2001, ACM, pp. 7-15.*

(Continued)

*Primary Examiner*—Almis R. Jankus
(74) *Attorney, Agent, or Firm*—Duft Bornsen & Fishman, LLP; Daniel N. Fishman

(57) ABSTRACT

Methods and associated systems for improving the visual quality of real-time interactive multimedia presentations, by blending 2-D image data derived from a plurality of 3-D scene views associated with one or more 3-D scenes in accordance with presentation data modifiable by user input in real-time. The 2-D image data rendered from the perspective of the individual scene views are blended together using an associated blend mode in a back to front order producing a 2-D composite image for projection on a display device to a user of the real-time interactive multimedia presentation.

52 Claims, 14 Drawing Sheets

U.S. PATENT DOCUMENTS

| | | | |
|---|---|---|---|
| 6,118,427 | A | 9/2000 | Buxton et al. |
| 6,124,864 | A | 9/2000 | Madden et al. |
| 6,128,712 | A | 10/2000 | Hunt et al. |
| 6,147,695 | A | 11/2000 | Bowen et al. |
| 6,160,553 | A | 12/2000 | Robertson et al. |
| 6,160,907 | A | 1/2001 | Dufournet |
| 6,192,156 | B1 | 2/2001 | Moorby |
| 6,226,038 | B1 * | 5/2001 | Frink et al. ............... 348/443 |
| 6,249,285 | B1 | 6/2001 | Madden et al. |
| 6,252,608 | B1 | 6/2001 | Snyder et al. |
| 6,266,028 | B1 | 7/2001 | Kang et al. |
| 6,266,053 | B1 | 7/2001 | French et al. |
| 6,269,196 | B1 | 7/2001 | Hamburg |
| 6,297,825 | B1 | 10/2001 | Madden et al. |
| 6,310,620 | B1 * | 10/2001 | Lauer et al. ............... 345/424 |
| 6,326,964 | B1 | 12/2001 | Snyder et al. |
| 6,337,703 | B1 | 1/2002 | Konar et al. |
| 6,373,490 | B1 | 4/2002 | Won |
| 6,384,822 | B1 | 5/2002 | Bilodeau et al. |
| 6,414,677 | B1 | 7/2002 | Robertson et al. |
| 6,442,658 | B1 | 8/2002 | Hunt et al. |
| 6,459,439 | B1 | 10/2002 | Ahlquist, Jr. et al. |
| 6,466,185 | B1 * | 10/2002 | Sullivan et al. ............... 345/6 |
| 6,678,002 | B1 * | 1/2004 | Frink et al. ............... 348/445 |
| 6,856,322 | B1 | 2/2005 | Marrin et al. |

OTHER PUBLICATIONS

McReynolds, Programming with OpenGL: Advanced Techniques, SIGGRAPH 1997, Course Notes, pp. 1, 22-28, 53-56, 111 114, 144-162, 179.*

Wipro Technologies: *MPEG-4 Video Decoder*, http://www.wipro.com; 2001; Wipro Technologies.

Koenen, Rob: *Overview of the MPEG-4 Standard*; ISO/IEC JTC/SC29/WG11 N3342 Coding of Moving Pictures and Audio http://library.n0i.net/graphics/mp-eg4_overview/; Mar. 2001; International Standards Organization.

Pereira, Fernando: *MPEG-4: Why, What, How and When?*: http://www.chianglione.org/mpeg/tutorials/papers/icj-mpeg4-si/02-overview_paper/2-overview; Publication Date Unknown; Instituto Superior Tecnico-Instituto de Telecommunicacoes.

Froumentin, Max: *Research Activities* 1997-2000; http://www.w3.org/People/maxf/past/research/description.html; Publication Date Unknown; www Consortium.

Epic Software Group Inc.; *Axel's Essentials Have The Inside Edge*; http://www.mindavenue.com; Publication Date Unknown; Epic Software Group, Inc.

Decoret Xavier, et al.; *Multi-layered Imposters for Accelerated Rendering*; Eurographics '99; 1999; vol. 18. No. 3; The Eurographics Association.

Optibase Ltd.; *Optibase White Paper A Guide to MPEG-4*; http://www.techonline.com/pdf/pavillions/standards/optibase_mpeg4.pdf; Publication Date Unknown: Optibase Ltd.

ISO; *The Virtual Reality Modeling Language*; VRML97 ISO/IEC 14772-1; 1997; 1997; Section 4.6; http://www.web3d.org/x3d/specifications/vrml/ISO-IEC-14772-VRML97/.

ISO; *The Virtual Reality Modeling Language —Part 1— Functional specification and UTF-8 encoding —Amendment 1 — Enhanced interoperability*; VRML97 ISO/IEC 14772-1: 1997/Amd. 1:2002(E); 2002; http://www.web3d.org/x3d/specifications/vrml/VRML97Am1/.

MPEG Industry Forum; *Understanding MPEG-4*; Document No. mp-in-40183; The MPEG Industry Forum: 2002; http://www.mpegif.org.

Smith, Alvy Ray; *Image Compositing Fundamentals —Technical Memo 4*; Microsoft: 1995.

Lambrecht, Christian et al.; *Perceptual Quality Measure using a Spatio-Temporal Model of the Human Visual System*; Swiss Federal Institute of Technology; Switzerland; 1996.

* cited by examiner

METHODS AND SYSTEMS FOR REAL-TIME, INTERACTIVE IMAGE COMPOSITION

BACKGROUND OF THE INVENTION

1. Field of the Invention

This invention relates generally to real-time, interactive multimedia and more specifically relates to rendering and blending techniques and systems used in the creation and presentation of real-time, interactive, three-dimensional (3-D) multimedia content on computer systems.

2. Discussion of Related Art

There exist standard rendering techniques referred to as "image composition." Image composition generally involves taking multiple static images and blending or mixing them together to form a more visually complex and appealing image.

There are several key steps to traditional image composition methods. First, several images are created independently through any of a variety of standard techniques. For example, a digital camera can record a picture in digital memory, or a three-dimensional (3-D) modeling and animation software package can render a digital, two-dimensional (2-D) image projection of a 3-D scene and save it as a computer file.

Using a plurality of such static images, the selected images are loaded into a composition software application. The images are typically created in a digital format or may be converted to a digital format from their original form.

Next, "layers" of images are combined or rendered together. Each image may be associated with a layer. A layer may be envisioned as a sheet of clear plastic imprinted with a 2-D image. Composition may then be envisioned as the stacking of multiple such layers one atop another and taking a picture of the final result.

Merely stacking such layers of images is insufficient to create a complex composite image. Rather, each layer must be "blended" with other layers, so that layers underneath a higher layer show through as desired in the final resulting image. As known in the art, such blending often uses extra image information known as "alpha channel" or "alpha" information that, for example, may be used to define the level of transparency for each object or pixel in the particular layer. Referring back to the metaphor of a clear plastic sheet imprinted with an image, one can further imagine that the alpha channel information may be used to define where different areas of the plastic sheet (different portions of the imprinted image) are more or less transparent than other areas of the plastic sheet.

In traditional image composition, there are two distinct types of image composition. A first type, considered more primitive, is often referred to as "masking" wherein particular portions of the combined images are either fully transparent or completely opaque. A second type of image composition, generally considered more advanced, is herein referred to as "blending", wherein each portion of an image may be combined mathematically with another image, allowing for example, each portion of the image to have any level of transparency in a spectrum ranging from fully transparent through completely opaque.

The techniques of advanced image composition can be applied to traditional video presentations, as videos are merely a series of static images presented to the viewer in quick succession. Postproduction video image composition generally involves taking multiple video clips from independent sources such as video cameras and 3-D graphics software, and blending or mixing their frame images together to form a more visually complex and appealing video. This step is typically called "postproduction" because it is a time intensive step that occurs after the primary video sources are created. Video presentations created with advanced image composition techniques using blending during postproduction can be more visually captivating and information dense compared to video presentations that do not use these techniques.

There exists a common media form known as "real-time interactive multimedia". Real-time interactive multimedia generally involves the real-time construction of a graphical presentation on an end-user's computing device, and the subsequent display of the constructed presentation on a video monitor or viewing device. Such presentations typically consist of a variety of media objects such as 2-D graphics, 3-D graphics, video, and text, all brought together in a single presentation. Real-time interactive multimedia presentations usually animate or modify these media objects through time for visual or functional effect. The modifications are often in response to user interaction with an input device such as a computer mouse or keyboard.

Computing devices include end-user computers such as personal computer ("PCs"), set-top devices, personal digital assistants ("PDAs") and workstations (all referred to herein synonymously as "computers", "personal computers", "user systems" or "PCs").

The term "real-time" as used herein refers to the fact that a computer system is constructing, or dynamically rendering, a presentation image in time for it to be displayed without the viewer losing a sense of visual continuity. The term "visual continuity" refers to the ability to cause the human visual cortex to see a continuous progression of visual events from a time sequence of discrete frames or images that are displayed in quick succession. This technique is used in movie theaters, by displaying a time sequence of pictures at a rate of 24 frames per second. Experts in human vision and signal processing observe that visual continuity decreases as the rate at which a series of pictures is displayed decreases, also known as the "frame rate". There are many dependent factors that affect visual continuity at a given frame rate, such as the type of multimedia presentation, the activity of the media objects within the presentation, among other factors. Generally speaking, 6 to 7 frames per second may be considered low quality, 8 to 19 frames per second may be considered good quality, and 20 frames per second and above may be considered high quality for multimedia presentations. Visual continuity may be achieved for special purposes in special sequences of images at rates of 5 frames per second or lower. In general, for most common multimedia presentations, visual continuity requires a frame rate of at least 5 frames per second.

Because each frame, or visual image, of a real-time interactive multimedia presentation is usually constructed after the last frame was presented to the viewer, but before the time at which visual continuity would be suspended, input to the computer by a user can affect the course of events in the presentation. Such interaction by the user allows the personal computer to produce a visual image, or frame, that differs from what would have been constructed and presented had the user not interacted with the presentation. This differs significantly from traditional video, where a series of static, pre-created images are displayed to a viewer in quick succession.

Real-time interactive multimedia presentations are usually stored as descriptions that tell the computer how to use various media objects to construct, or render, frames of images through time. Additionally, such descriptions instruct the computer as to how it should respond to user input during the presentation, allowing for increased utility for the user. Subsequently, real-time interactive multimedia presentations can produce large quantities of visual information from relatively small descriptions based on mathematical and algorithmic descriptions, by combining and rendering media objects in real-time on a viewer's computer. Such a description for constructing real-time interactive multimedia imagery is also known herein as "presentation data."

More specifically, the presentation data used for the creation or rendering of a real-time interactive multimedia presentation typically includes scenes and scene views. As used herein, a "scene" is an algorithmic and mathematical description of media objects and their behavior through time, existing within a common coordinate system. As known in the art, a scene may have one or more associated virtual "cameras", also known herein as "scene views", or simply "views". A scene view is a description of how image data should be calculated or rendered from an associated scene. A scene view is described in relation to a coordinate system in which media objects belonging to that scene are situated, enabling imagery to be derived from the scene. The properties of a view, such as where the view is spatially situated within the scene coordinate system and how the view is rotated in relation to the scene coordinate system, affect the imagery that is derived from the scene. Additionally, the scene view may specify additional properties that affect how the image data is rendered or calculated from the scene.

Real-time interactive multimedia presentation files tend to be much smaller, measured in bytes, than a comparable-quality digital video file that displays the same visual information. Additionally, traditional video is not generally interactive, and therefore does not allow a user to change the course of events in a presentation while it is being viewed. Consequently, real-time interactive multimedia is very desirable for many applications where traditional video is too large, such as delivery over a bandwidth constrained computer network, or where traditional video does not provide the required interactivity, such as educational applications.

However, real-time interactive multimedia systems typically use forms of image composition that are inferior in quality and style to advanced postproduction image composition techniques used with static images and traditional video. Specifically, real-time interactive multimedia systems allow for limited forms of image composition using real-time 2-D and 3-D scenes, but do not allow image composition involving the blending of imagery derived from multiple real-time 3-D scene views. The blending of imagery derived from multiple real-time views in relation to one or more 3-D scenes yields a graphical style similar to the advanced postproduction-oriented image composition used in the creation of static images and traditional video. Consequently, the real-time image composition methods operable in current real-time interactive multimedia systems handicap the visual quality of their presentations, rendering them less visually captivating and less information dense.

In sum, present media systems confront the user with a choice-they can use visually appealing video with advanced image composition but sacrifice dynamic interactivity and smaller file sizes, or they may use size-efficient, real-time interactive multimedia, but sacrifice the visually appealing features of blended, layered 3-D image composition.

It is evident from the above discussion that a need exists for an improved method of rendering real-time interactive multimedia presentations.

SUMMARY OF THE INVENTION

The present invention solves the above and other problems, thereby advancing the state of the useful arts, by providing methods and associated systems that enable advanced, postproduction-oriented, layered composition techniques to be used with interactive, real-time 3-D multimedia presentations. In general, the invention provides for the rendering and blending of imagery from multiple 3-D scene views associated with one or more 3-D scenes by a personal computer and the subsequent display onto a video monitor or viewing device. The methods and structures of the invention enable such rendering to occur at speeds sufficient to maintain visual continuity and provide end-user interactivity in the process. In particular, the methods and systems of the present invention allow for the iterative, real-time rendering and blending of imagery derived from multiple real-time scene views associated with one or more 3-D scenes into 2-D presentation imagery that is displayed to a user of an interactive, real-time multimedia presentation.

In a first exemplary preferred embodiment, 2-D image data is calculated or rendered from the perspective of a plurality of 3-D scene views, and blended together in real-time into a layered, composite 2-D image for presentation to the user. As used herein, "2-D image data" refers to information that composes a 2-D image. Each scene view defines a "layer" of 2-D image data that may be blended with other layers of 2-D image data in a specified order. As used herein, the term "layer" refers to 2-D image data calculated or rendered from the perspective of a single 3-D scene view associated with a 3-D scene. A plurality of such layers is blended together in a back to front order, and may use alpha channel information during the blending of 2-D image data comprising individual layers. A layer that is in the front position is rendered on top of all other layers, thereby possibly occluding or covering layers behind it. Likewise, a layer that is in the back position is on the bottom of other layers, thereby being possibly occluded or covered by layers in front of it.

Layers are rendered from the perspective of a 3-D scene view associated with a 3-D scene by first rendering all of the opaque 3-D objects within the associated scene, and secondly, rendering all of the non-opaque 3-D objects within the associated scene. As used herein, the term "3-D object" or simply "object" refers to polygonal or other geometric structures that are described in a three-dimensional space, or coordinate system belonging to a particular scene. As a matter of convention, distances from the camera or view are usually measured along the camera's "z-axis", an imaginary line that extends away from the scene camera, centered in the middle of its field of view. The distance from the scene camera measured along the camera's z-axis is also known as the "z-depth", where a larger z-depth represents a further distance from the scene camera measured along its z-axis and a smaller z-depth represents a shorter distance from the scene camera measured along its z-axis.

These aspects of the invention permit the rendering of multiple layers, each with its own camera perspective and other attributes, and further provides for blending of such multiple layers into a single composite 2-D image for presentation to the user. Each 3-D scene view and associated 3-D scene retain their real-time attributes including end-user interactivity and graphical attributes. Graphical attributes include parameters or attributes of the scene or view such as: animation, other camera movement and perspective attributes, as well as other dynamic information used in the image blending process such as alpha channel information. Such attributes may be associated with a scene (including all views thereof), a particular view of a scene, or both. The resulting presentation produces visual results comparable to advanced off-line, static image composition used with video, while maintaining the desirable characteristics of real-time interactive multimedia.

More specifically, the methods of this exemplary preferred embodiment of the present invention utilize render context frame and z-buffer features available in most present 3-D video hardware and software rasterizers. A "render context" refers to the memory and data required to render an image. A "frame buffer" is an area in memory where an image may be constructed, typically considered part of the render context. A "z-buffer" is an area in memory used for determining how objects within a scene are to obscure other objects in a scene for purposes of rendering visually correct scenes, typically considered part of the render context. As known in the art, a "rasterizer" is a process responsible for "rasterization", the steps of determining pixel values from input geometric primitives. As used herein, a "pre-rasterizer" is a process responsible for preparing scene data for efficient and correct rendering by a rasterizer.

The frame buffer and z-buffer are preferably first cleared before rendering a frame image. Each layer is then preferably rendered from back to front into a single frame buffer, one in front of another, in turn. The z-buffer is preferably cleared between the rendering of each layer, but the frame buffer is not cleared.

Again, an individual layer is preferably constructed by first rendering all of the opaque 3-D objects within the associated scene into the destination render context frame buffer. At the same time, z-depth information is preferably recorded in the destination render context z-buffer that reflects the fact that an opaque 3-D object occupies particular portions of the destination render context frame buffer at various z-depths. Before each pixel of each opaque 3-D object is rendered to the destination render context frame buffer, a test known as the "z-depth test" is preferably performed on the corresponding destination render context z-buffer location to determine whether or not a pixel should to be written to the destination render context frame buffer. After all of the opaque 3-D objects are rendered to the destination render context frame buffer, the non-opaque 3-D objects are preferably rendered to the destination render context frame buffer subject to the same z-depth test.

Those skilled on the art will recognize that there are many correct and efficient ways to perform the intended functionality of the z-depth test that may not require a z-buffer per se. Other methods for determining the relative ordering of projected pixels of 3-D objects within a scene for the purposes of correct visual rendering are well known in the art. Examples of such well-known methods include the "scanline" method among others. The specifics of these methods and alternate methods, as well as the specific implementation of the z-depth test, are not material to this invention. The present invention may utilize any test or method that ensures the intent (or "contract") of the depth test function for the correct visual rendering of a 3-D scene in accordance with this invention.

The blending of each layer with the contents of the destination render context frame buffer preferably takes place during the rendering of the layer. As each pixel, or addressable value containing color and optional alpha channel information, is calculated during the rendering of a 2-D projection of the associated 3-D scene, the newly calculated value is preferably "blended" with the corresponding pixel value that already exists within the destination render context frame buffer, in order to create a new pixel value within the destination render context frame buffer. The two pixels are preferably "blended" or combined, according to associated "blend modes" that are specified from the presentation data, typically from information within the scene view and/or associated scene. A blend mode preferably specifies a mathematical operation that is to be performed with the newly calculated pixel value (that may include alpha information) from the scene and the corresponding pixel value that already exists within the destination render context frame buffer (that may include alpha information), in order to create a new pixel value within the destination render context frame buffer. In this way, the blending of independent layers occurs as each individual layer is being rendered.

Examples of such pixel blending operations include the multiplication of the new source pixel value with its relative percentage transparency value (from associated alpha channel information), followed by the multiplication of the destination pixel value with its relative percentage transparency value (from associated alpha channel information), followed by the addition of these two resulting values to form the final, blended destination pixel value. Numerous other mathematical operations used in pixel blending will be readily recognized by those skilled in the art. Mathematical operations may include bitwise logical operations as appropriate for the desired blending function. Further, as discussed further herein, mathematical operations may include operations based on 2-D image data in other layers. Any and all such methods may be used in accordance with the present invention and need not be discussed further herein.

Because this first exemplary preferred embodiment of the present invention uses a single frame buffer to render all of the independent layers and create the composite image, the amount of memory that is used for calculating the composite image is minimized. Such a reduction in memory usage can dramatically enhance the performance of the image rendering process on computer systems with limited video memory resources.

In a second exemplary preferred embodiment, some or all of the layers are completely rendered into separate intermediate render context frame buffers before blending the contents of the intermediate render context frame buffers into a final, destination render context frame buffer. Such intermediate render contexts are reusable memory resources for rendering and storing 2-D image data that is derived from a 3-D scene from the perspective of a 3-D scene view. Intermediate render context frame buffers are also known herein as "intermediate frame buffers."

Each 3-D scene view is preferably assigned to an available intermediate render context, from a pool of one or more available intermediate render contexts. As each pixel, or addressable value containing color and optional alpha channel information, is calculated during the rendering of a 2-D projection of the associated 3-D scene from the perspective of the 3-D scene view, the newly calculated value is placed in the associated intermediate render context frame buffer, preferably according to a z-depth test utilizing the associated z-buffer.

Once the layer has been rendered into the intermediate render context frame buffer, the intermediate render context frame buffer is preferably made available for blending. The pixels of the layers contained within the intermediate render context frame buffers are blended in a back to front order according to an associated blend mode that is specified from the presentation data. The blend mode specifies the mathematical operations that are to be performed with a calculated pixel value (that may include alpha information) from an intermediate render context frame buffer and a corresponding pixel value (that may include alpha information) within the destination render context frame buffer, in order to create a new pixel value within the destination render context frame buffer. As mentioned above, the mathematical operations used in pixel blending that are specified by the blend mode are various and well known by those who are skilled in the art and need not be discussed further herein.

Once the image contents (layer) of an intermediate render context frame buffer have been blended into the destination render context frame buffer, the intermediate render context is returned to the pool of available intermediate render contexts, for use in the rendering of subsequent layers.

Because this second exemplary preferred embodiment of the present invention uses intermediate render contexts to render layers before blending them into a composite frame or image (destination render context), the amount of memory that is used for calculating the composite image is greater than in the first exemplary preferred embodiment. However, because the process of rendering a layer can be independent from the rendering of other layers, assuming that a plurality of intermediate render contexts exists, the rendering of all or some of the individual layers can be performed simultaneously, or in parallel. Such a use of parallel processing can dramatically enhance the performance of the image rendering process on computer systems with greater video memory resources or additional graphics processors.

DETAILED DESCRIPTION OF THE PREFERRED EMBODIMENTS

Figure 1:
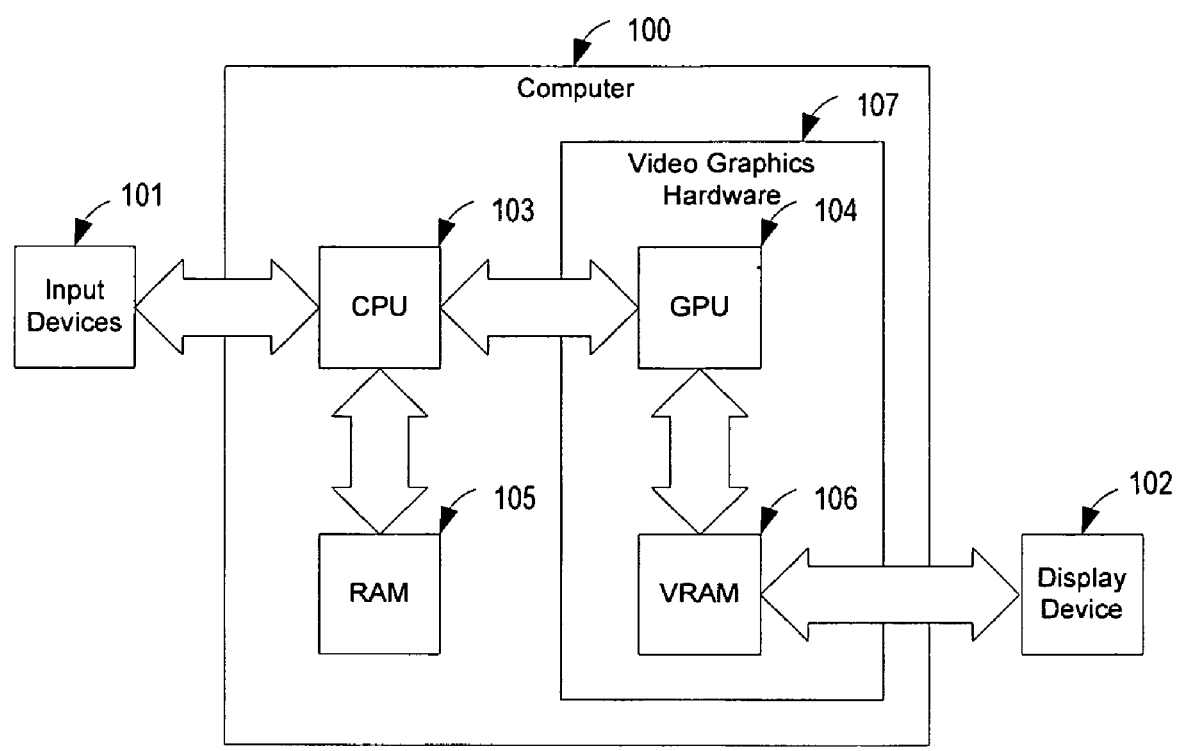
FIG. 1 is a block diagram of the various hardware components found on a typical personal computer.

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the invention is to cover all modifications, equivalents, and alternatives falling within the spirit and scope of the invention as defined by the appended claims.

Figure 12:
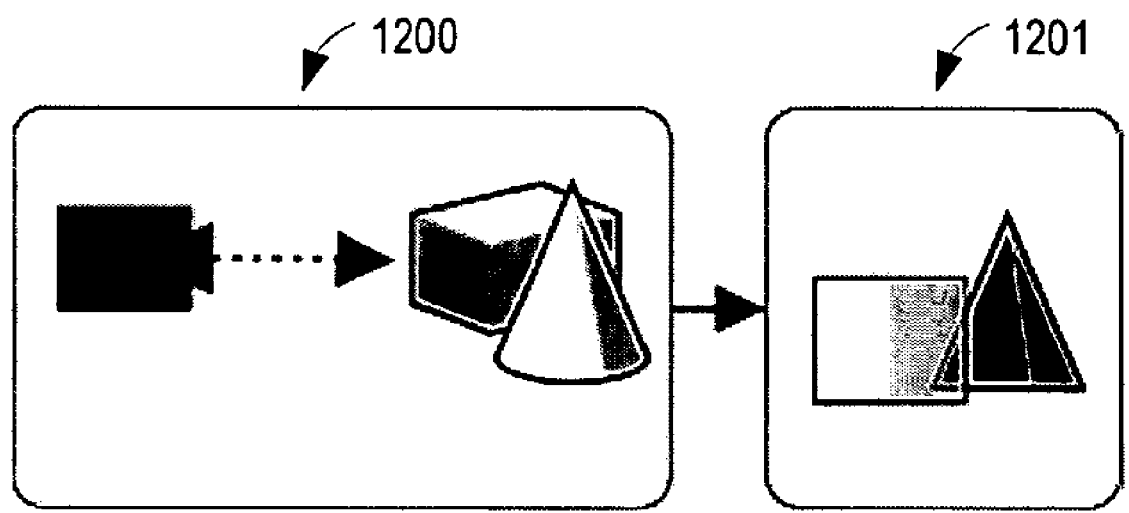
FIG. 12 is a block diagram of a typical real-time 3-D multimedia rendering process as presently known in the art.

FIG. 12 is a block diagram of a typical real-time 3-D interactive multimedia rendering process as presently known in the art. Element 1200 illustrates a single 3-D scene view operable within a 3-D scene, that produces element 1201, an image or frame that is rendered in real time and displayed successively to the user. It is important to note that the resulting imagery 1201 may contain blending between 3-D objects that are described within the 3-D scene.

Although not illustrated in FIG. 12, it should be noted that the blending of image 1201 with 2-D images and text that were not rendered from a 3-D scene in real-time, is well known in the art and need not be further discussed here.

Figure 13:
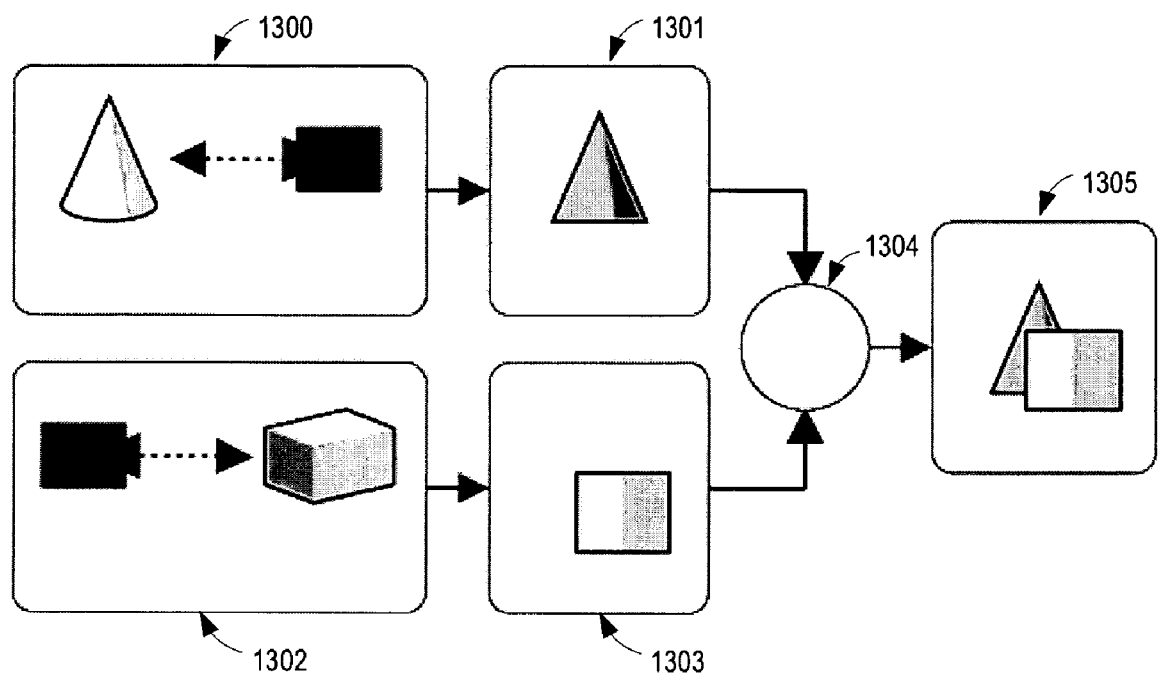
FIG. 13 is a block diagram of a layered real-time 3-D multimedia rendering process as presently known in the art.

FIG. 13 is a block diagram of a layered real-time 3-D interactive multimedia rendering process as presently known in the art. Element 1300 depicts one 3-D scene view associated with a 3-D scene, that produces element 1301, an image or frame that is rendered in real-time. Element 1302 illustrates a second 3-D scene view associated with the same or a different 3-D scene, that produces element 1303, an image or frame that is rendered in real-time. Element 1304 illustrates a process of combining elements 1301 and 1303, producing element 1305, a composite image that is created and displayed successively to the user in real-time. It is important to note that element 1304 that produces element 1305 does not allow for the blending of images 1301 and 1303. Instead, a more primitive type of image composition, often referred to as "masking", is operable wherein particular portions of the images (1301 and 1303) are either fully transparent or completely opaque.

Although not illustrated in FIG. 13, it should be noted that the blending of image 1305 with 2-D images and text that were not rendered from a 3-D scene in real-time, is well known in the art and need not be further discussed herein.

Figure 14:
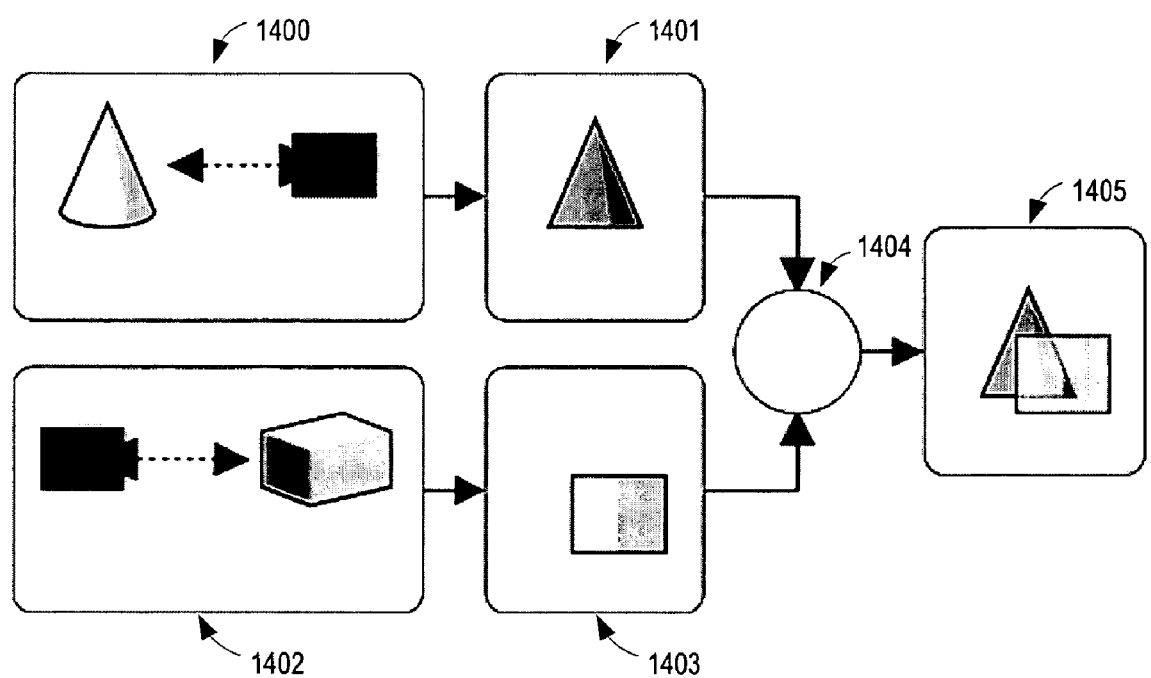
FIG. 14 is a block diagram of a layered real-time 3-D multimedia rendering process in accordance with the present invention.

FIG. 14 is a block diagram of a layered real-time 3-D interactive multimedia rendering process in accordance with the present invention. Element 1400 depicts one 3-D scene view associated with a 3-D scene, that produces element 1401, an image or frame that is rendered in real-time. Element 1402 illustrates a second 3-D scene view associated with the same or a different 3-D scene, that produces element 1403, an image or frame that is rendered in real-time. Element 1404 illustrates a process of combining elements 1401 and 1403, producing element 1405, a composite image that is created and displayed successively to the user in real-time. It is important to note that element 1404 that produces element 1405 allows for the blending of images 1401 and 1403. Thus, blending between 2-D images derived from independent 3-D scene views can be expressed in the final, rendered frame 1405.

FIG. 1 is a block diagram that provides an overview of a typical context in which the present invention may operate. A user (not shown) provides input to computer 100 via standard user input device(s) 101. Exemplary input devices include keyboards, pointing devices such as a mouse or tablet, voice command input, touch sensitive devices, joystick, etc. The central processing unit (CPU) 103 in computer system 100 processes such input and may consequently modify presentation data stored in random access memory (RAM) 105. Changes to scenes, objects, and scene views as a consequence of user input, or changes due to internal or scripted presentation behavior are communicated as parameters to video graphics hardware 107 via standard system busses or special purpose video busses as known in the art. A graphics processing unit 104 (GPU) processes these parameters in the rendering a 3-D scene or sources from the perspective of various 3-D scene views to generate a 2-D composite projection in video memory 106 which is, in turn, presented on display device 102. Any of several standard command structures may be used to communicate such graphics commands between CPU 103 and GPU 104 including, for example, DirectX or OpenGL command structures.

Figure 2:
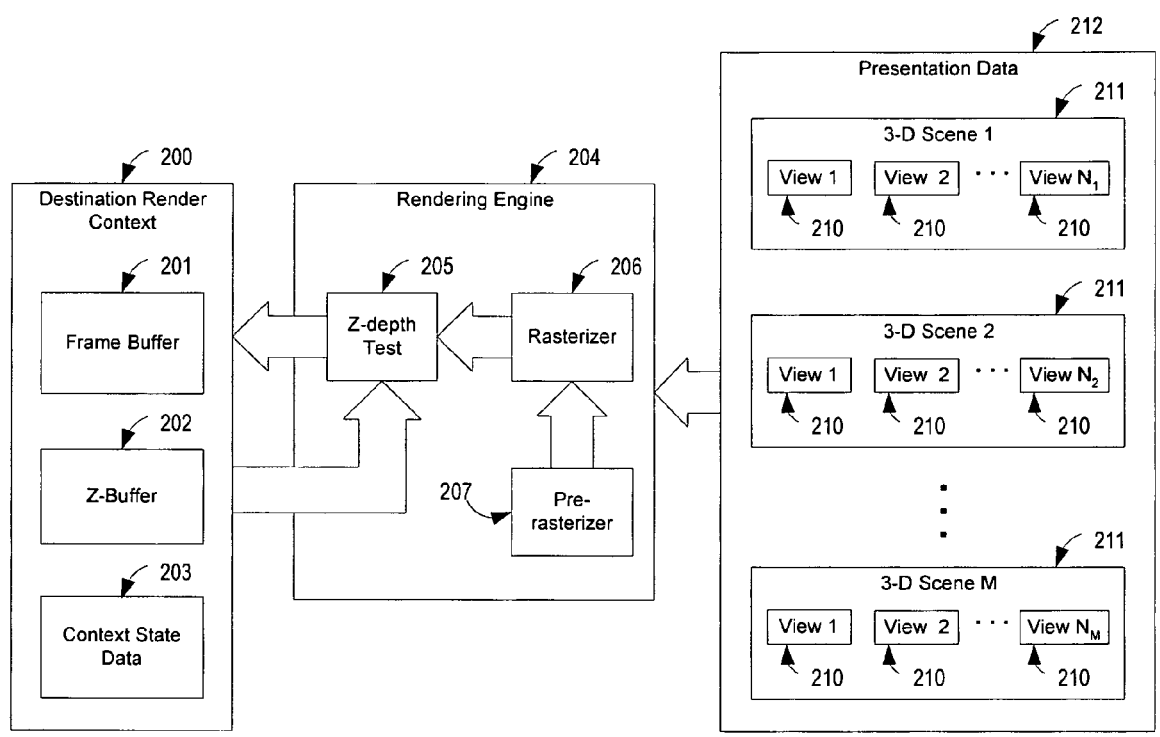
FIG. 2 is a block diagram of the various system components in accordance with a first exemplary preferred embodiment of the present invention.

FIG. 2 is a block diagram of elements of a system in accordance with a first exemplary preferred embodiment of the present invention that allows layered, blended 3-D rendering for real-time interactive multimedia presentations. Those skilled in the art will recognize that features of FIG. 2 may be equivalently implemented as custom circuits in an enhanced video display adapter such as video graphics hardware 107 of FIG. 1 or as software programmed to operate a special purpose or general-purpose processor. Such a programmed processor may, in turn, reside on an enhanced display adapter or may be a general-purpose processor within a standard PC or user workstation.

Presentation data 212 contains one or more 3-D scenes 211, where each of the 3-D scenes 211 is rendered from the perspective of one or more associated 3-D scene views 210 in real-time by rendering engine 204 into a single blended, composite 2-D image residing in a destination render context 200, that is subsequently projected to a display device.

Destination render context 200 comprises memory used for storing a generated image and related parameters. In particular, destination render context 200 includes frame buffer 201 for storing drawn pixels of an image, z-buffer 202 for storing information pertaining to the depth of drawn pixels, and context state data 203 that stores temporary rendering and/or scene information. Those skilled on the art will recognize that the exact configuration of the destination render context 200 may be determined by video or computer hardware, or software command structures used in 3-D rendering such as DirectX or OpenGL.

Pre-rasterizer 207 and z-depth test 205 perform standard image processing as presently known in the art. In particular, pre-rasterizer 207 performs various pre-processing of the scene data for purposes of, for example, clipping, transform, and lighting operations that prepare the rasterizer 206 for efficient and correct rendering. Output of rasterizer 206 is provided as input to z-depth test 205. As is known in the art, z-depth test 205 allows for the correct drawing of projected pixels relative to one another within the scene by evaluating 3-D visibility of pixels based on z-depth (within a single layer) as defined by information in z-buffer 202. By sorting the objects to be drawn as an optional performance enhancement, the z-depth test 205 reduces pixel overdrawing. Usage of a z-buffer in this manner is well known to those skilled in the art and need not be discussed further herein.

Those skilled on the art will recognize that there are many correct and efficient ways to perform the intended functionality of the z-depth test that may not require a z-buffer per se. The specifics of these alternate methods, as well as the specific implementation of the z-depth test, are not material to this invention, but an algorithm that upholds the intent or "contract" of the z-depth test is preferred for the correct rendering of a 3-D scene as known in the art and in accordance with this invention.

Figure 3:
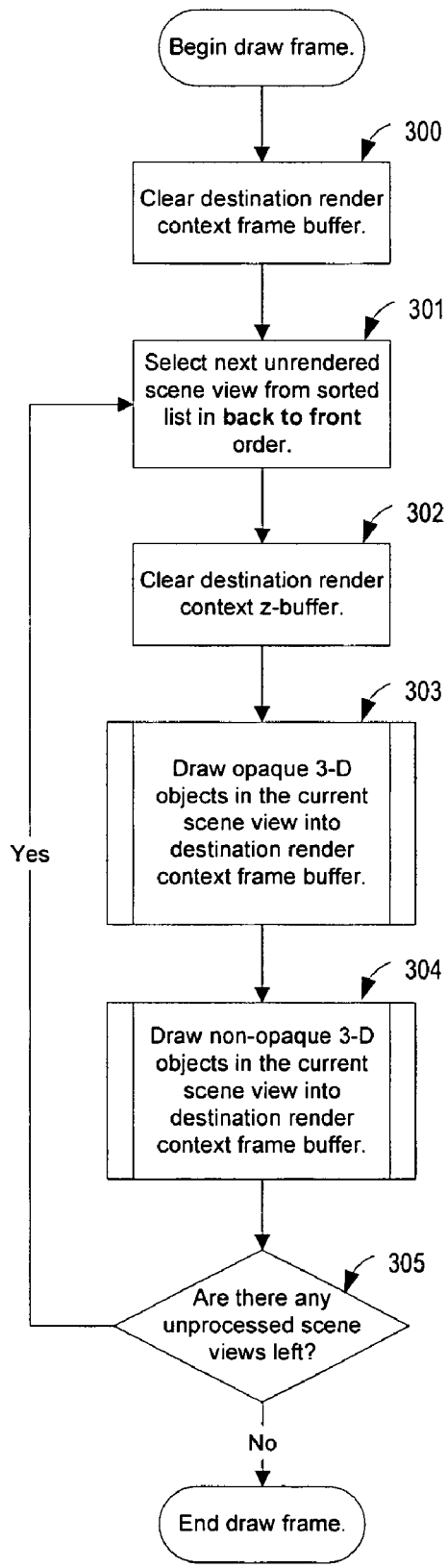
FIG. 3 is a flowchart describing the process of drawing a frame consisting of multiple layers for display in accordance with a first exemplary preferred embodiment of the present invention.

FIG. 3 is a flowchart describing the process of drawing a frame consisting of multiple layers for display in accordance with a first exemplary preferred embodiment of the present invention. As noted above, a sequence of such frames or images are generated at a suitably fast rate to present a real-time interactive multimedia presentation. Such a sequence of frames may be generated by repetitive execution of the process of FIG. 3. Further, as noted above, the method of FIG. 3 is preferably operable within a GPU of a video adapter but may equivalently be performed in an appropriately programmed general purpose processor coupled with memory and a graphics output device.

Element 300 of FIG. 3 is operable to clear the destination render context frame buffer in preparation for drawing pixels of a new frame. Elements 301 through 305 are then iteratively executed to render and blend each layer creating a composite frame or image. In particular, element 301 prepares for processing of the next (or first) scene view, from a sorted list (plurality) of scene views, that will define the next (or first) layer of the composite frame. Element 302 clears the destination render context z-buffer before each layer is drawn so that objects within that layer are properly overlaid one atop another. Element 303 then draws pixels for all fully opaque 3-D objects in the present scene view. Next, pixels of all non-opaque 3-D objects in the present view are drawn by element 304. Element 305 then determines whether additional layers remain to be rendered. If so, processing continues by looping back to element 301 to process further layers of the present frame. If no further layers remain to be drawn, the method completes.

Fully opaque 3-D objects in a scene view are first drawn by operation of element 303 followed by all non-opaque objects in a scene view by operation of element 304. The z-buffer is used in order to render the 3-D objects within a 3-D layer correctly and optionally to reduce overdrawing of pixels for 3-D objects within a layer as a rendering performance enhancement. Subsequently drawn layers will overdraw earlier drawn pixels by virtue of their later drawing in the frame buffer. Further details of the operation of elements 303 and 304 are provided below.

Figure 4:
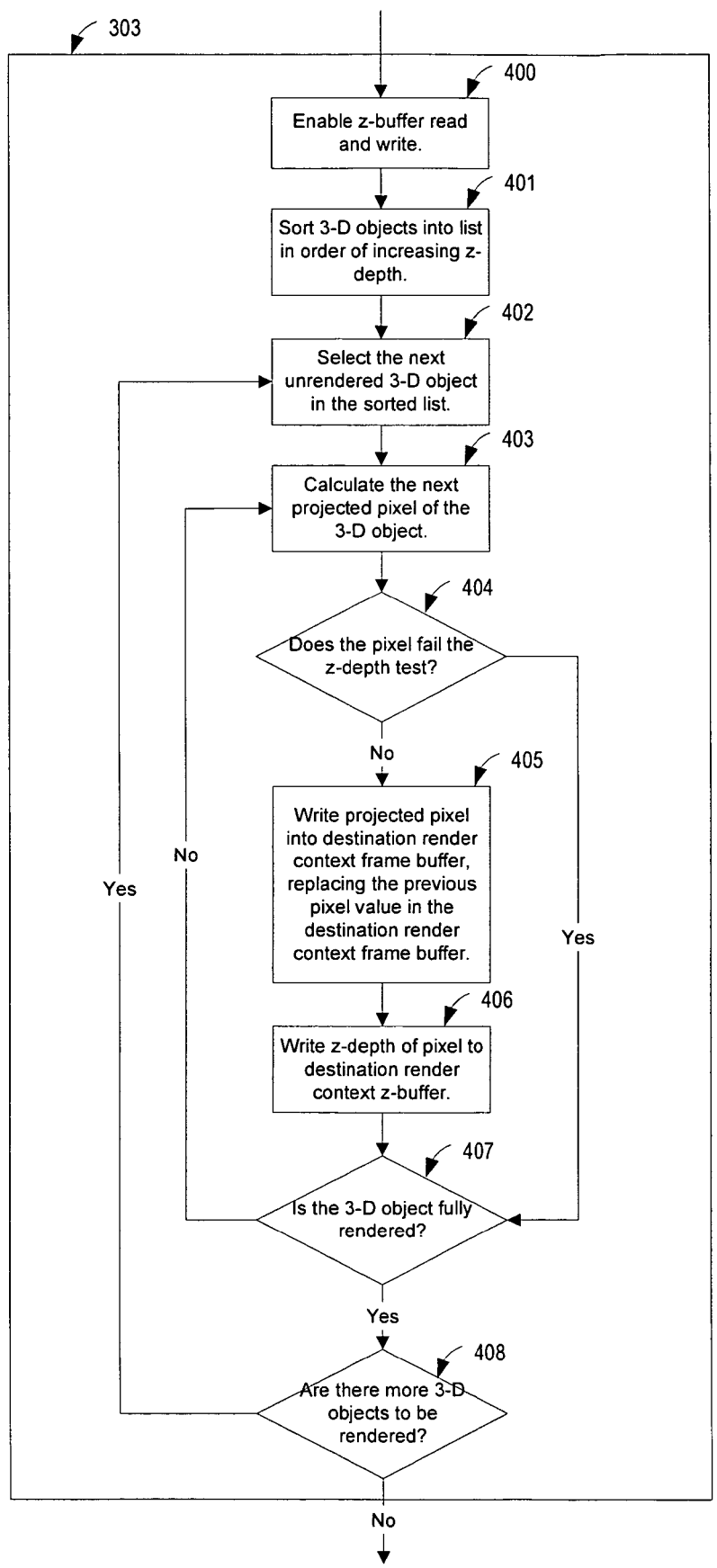
FIG. 4 is a flowchart describing the process of drawing the opaque 3-D objects that are found within a scene view in accordance with a first exemplary preferred embodiment of the present invention.

FIG. 4 is a flowchart providing additional details of the operation of element 303 to draw the opaque 3-D objects in the present scene view during the creation of a frame. Opaque elements are drawn with full read/write manipulation of the z-buffer. The drawing of opaque 3-D objects alters the contents of the z-buffer (write) so that the z-depth test can be performed correctly. A z-depth test (read) determines whether a particular projected, opaque pixel is closer or farther away from the camera (corresponding to decreasing and increasing z-depth respectively) in the current scene relative to other pixels in the current scene. Before a newly calculated pixel value is written to the destination render context frame buffer, the z-depth test determines whether the pixel should be written based on the z-depth of any pixels previously written to the frame buffer and the z-depth of the new pixel. Such use of a z-buffer in drawing rendered pixels is well known to those skilled in the art and need not be further discussed here.

Element 400 enables z-buffer reading and writing. Such read and write access enables use of the z-buffer for recording and comparing the relative depths of pixels written to the frame buffer. Element 401 then sorts the opaque 3-D objects of the present scene view in order of increasing z-depth. Notice that 401 is merely a performance enhancing activity as known in the art that prevents pixel overdraw and is completely optional. Other methods of sorting opaque objects for efficiency in the rendering process exist and are well known in the art. Elements 402–408 are then iteratively operable to process each opaque 3-D object in the present scene view (optionally in the sorted order prepared by element 401). Specifically, element 402 prepares to process the next (or first) 3-D object of the present scene view. Elements 403–407 are then iteratively operable to process each projected pixel of the present 3-D object of the present scene view. Specifically, element 403 calculates or renders the next (or first) projected pixel in the present 3-D object. Note that the mathematical operations used for the calculation or rendering of a 2-D pixel from a 3-D scene from the perspective of a 3-D scene view are various and well known by those who are skilled in the art and need not be discussed further herein. Element 404 performs the z-buffer depth test on the pixel information to determine whether the pixel is to be drawn or should be obscured by an earlier drawn pixel, and thus not drawn. If the z-buffer depth test indicates the pixel should not be drawn, processing continues at element 407 below. If the pixel is to be drawn, element 405 writes the pixel into the frame buffer and then element 406 records the z-depth of the pixel in the z-buffer for future z-depth tests. Processing then continues at element 407 to determine if further pixels remain to be processed in the present 3-D object in the present scene view. If so, processing continues by looping back to element 403 to process the next pixel of the present 3-D object in the present scene view. If no further pixels remain to be processed, processing continues at element 408 to determine if further opaque 3-D objects remain to be processed in the present scene view. If so, processing loops back to element 402 to prepare for processing the next 3-D object in the present scene view. If element 408 determines that no further opaque 3-D objects need be processed, processing of the method is completed.

Figure 5:
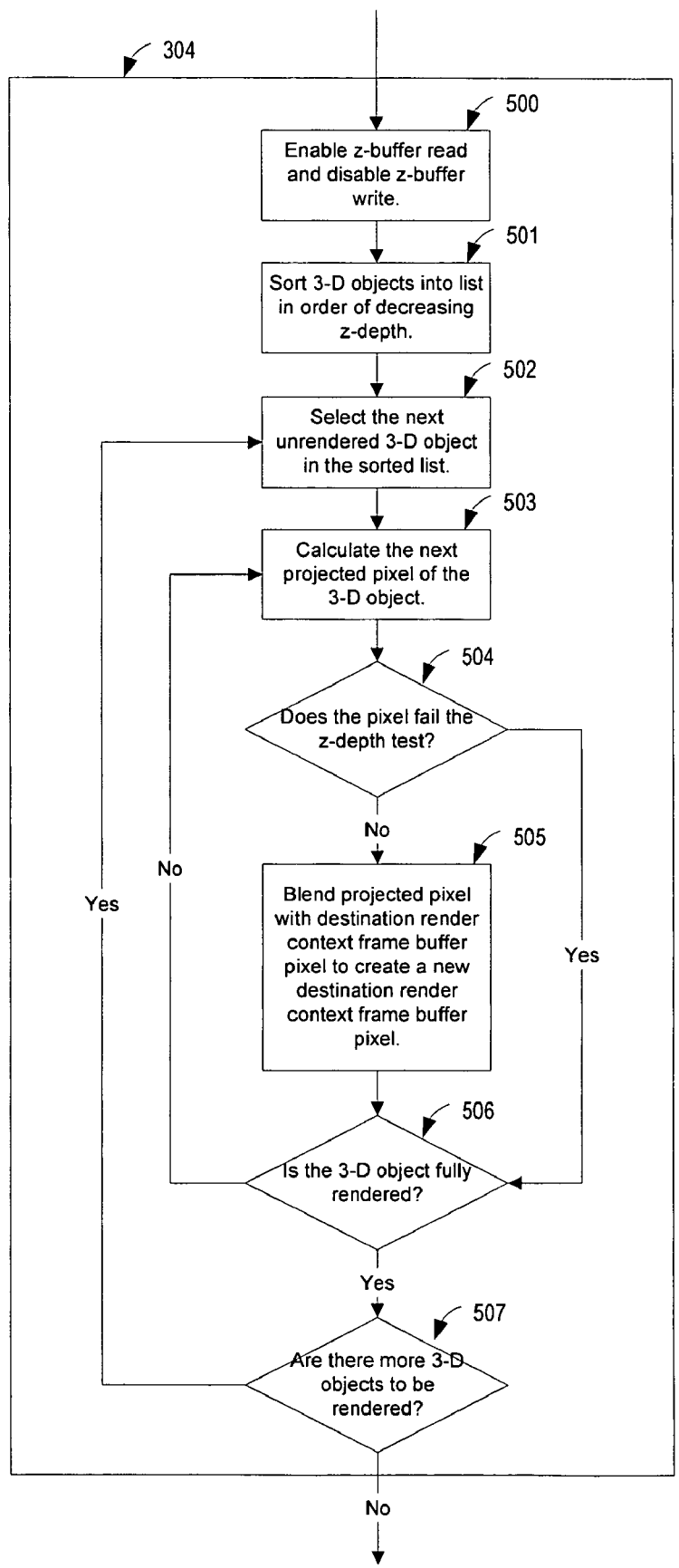
FIG. 5 is a flowchart describing the process of drawing the non-opaque 3-D objects that are found within a scene view in accordance with a first exemplary preferred embodiment of the present invention.

FIG. 5 is a flowchart providing details of element 304 of FIG. 3 to process non-opaque 3-D objects in the present scene view. The processing of FIG. 5 is nearly identical to that of FIG. 4 with the following exceptions. Element 500 enables the z-buffer for reading but disables the z-buffer for writing rather than enabling z-buffer read and write as in FIG. 4, element 400. Further, element 501 sorts the non-opaque 3-D objects in the present layer in order of decreasing z-depth rather than in increasing z-depth as in FIG. 4, element 401. It should be noted that element 501 is not a performance enhancing operation, as in FIG. 4 element 401. Rather, it is an optional step to minimize "rendering errors" for blend operations where the order of blending is important, also known as non-commutative blend operations.

Those skilled in the art will recognize that "rendering errors" are not necessarily critical, and are merely visual anomalies in a rendered image compared to its original mathematical description provided by a 3-D scene view and its associated 3-D scene.

Rather than merely writing the newly calculated pixel into the destination render context frame buffer as in FIG. 4 element 405, element 505 performs a mathematical blend operation with the newly rendered pixel and the pixel already stored in the destination render context frame buffer, in order to create a new destination render context frame buffer pixel. As discussed above, the two pixels are "blended" or combined, according to an associated "blend mode" that is specified from the presentation data. In FIG. 5, there exists no similar operation to FIG. 4, element 406 for writing to the z-buffer. These differences enable the rendering of non-opaque pixels subject only to z-depth testing against previously written opaque pixels, preventing the blending of non-opaque pixels with opaque pixels that are in front of them, as measured by z-depth.

Figure 6:
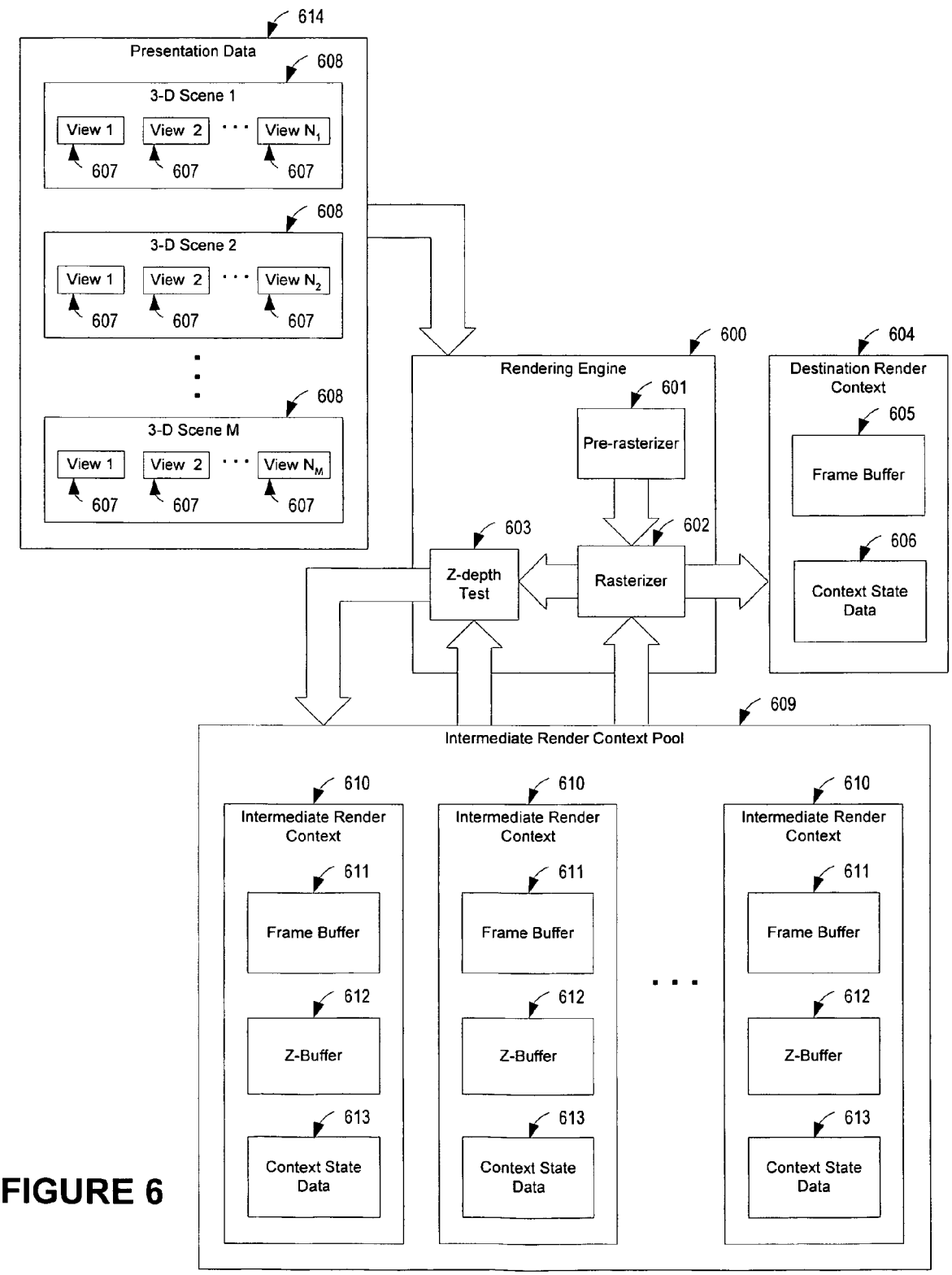
FIG. 6 is a block diagram of the various system components in accordance with a second exemplary preferred embodiment of the present invention.

FIG. 6 is a block diagram of elements of a system in accordance with a second exemplary preferred embodiment of the present invention that allows blended, layered 3-D rendering for real-time interactive multimedia presentations. Those skilled in the art will recognize that features of FIG. 6 may be equivalently implemented as custom circuits in an enhanced video display adapter or as software programmed to operate a special purpose or general-purpose processor. Such a programmed processor may, in turn, reside on an enhanced display adapter component or may be a general-purpose processor within a standard PC or user workstation.

Presentation data 614 is comprised of one or more 3-D scenes 608, where each of the 3-D scenes 608 is rendered from the perspective of one or more associated 3-D scene views 607 in real-time by rendering engine 600 into a single blended, composite image residing in a destination render context 604, that is subsequently projected to a display device.

Destination render context 604 comprises memory used for storing a rendered image and related parameters. In particular, destination render context 604 includes frame buffer 605 for storing drawn pixels of an image and context state data 606 that stores temporary rendering and/or scene information.

A set of intermediate render contexts 609 is comprised of a plurality of intermediate render contexts 610. An intermediate render context 610 comprises memory used for storing a generated image and related parameters. In particular, intermediate render context 610 includes frame buffer 611 for storing drawn pixels of an image, z-buffer 612 for storing z-depth information pertaining to pixel depth, and context state data 613 that stores temporary rendering and/or scene information. Those skilled on the art will recognize that the exact configuration of the intermediate and destination render contexts, elements 610 and 604 respectively, may be determined by video or computer hardware, or software command structures used in 3-D rendering such as DirectX or OpenGL.

Pre-rasterizer 601 and z-depth test 603 perform standard image processing as presently known in the art. In particular, pre-rasterizer 601 performs various pre-processing of the scene data for purposes of, for example, clipping, transform, and lighting operations that prepare the rasterizer 602 for efficient and correct rendering. Output of rasterizer 602 is provided as input to z-depth test 603. As is known in the art, z-depth test 603 allows for the correct drawing of polygons relative to one another within the scene by evaluating 3-D visibility of pixels based on z-depth (within single layer) as defined by information in z-buffer 612.

Those skilled on the art will recognize that there are many correct and efficient ways to perform the intended functionality of the z-depth test that may not require a z-buffer per se. The specifics of these alternate methods, as well as the specific implementation of the z-depth test, are not material to this invention, but an algorithm that upholds the intent or "contract" of the z-depth test is required for the correct rendering of a 3-D scene as known in the art and in accordance with this invention.

Figure 7:
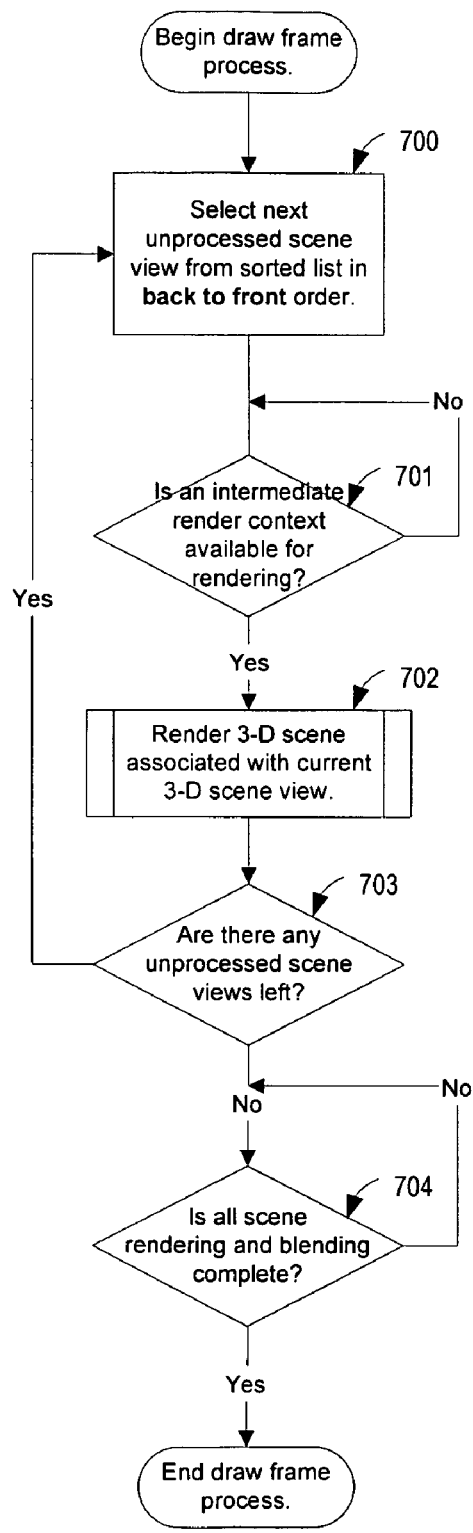
FIG. 7 is a flowchart describing the process of drawing a frame consisting of multiple layers for display in accordance with a second exemplary preferred embodiment of the present invention.

FIG. 7 is a flowchart describing the process of drawing a frame or composite 2-D image from multiple 3-D scenes views for display in accordance with a second exemplary preferred embodiment of the present invention. As noted above, a sequence of such frames or images are generated to present a real-time interactive multimedia presentation. Such a sequence of frames may be generated by repetitive execution of the process of FIG. 7. Further, as noted above, the method of FIG. 7 is preferably operable within a GPU of a video adapter but may equivalently be performed in an appropriately programmed general purpose processor coupled with memory and a graphics output device.

Elements 700 through 703 are repetitively executed to draw each layer of the composite frame or 2-D image. In particular, element 700 of FIG. 7 prepares for processing of the next (or first) scene view, from a sorted list (plurality) of scene views, that will define the next (or first) layer of the composite frame. Element 701 determines if an intermediate render context is available from the pool of available intermediate render contexts. If not, element 701 waits until such an intermediate render context is available. If so, processing continues to element 702 operable to render the present 3-D scene associated with the present 3-D scene view (described in FIG. 8) either as a serial process or as a separate parallel process. Element 703 then determines whether additional layers remain to be rendered. If so, processing continues by looping back to element 700 to render further layers of the present frame. If no further layers remain to be processed, element 704 awaits the completion of any scene rendering processes that may be operating in parallel. Once all of the scene rendering and blending is done, the method completes. Further details of the operation of element 702 are provided below.

Figure 8:
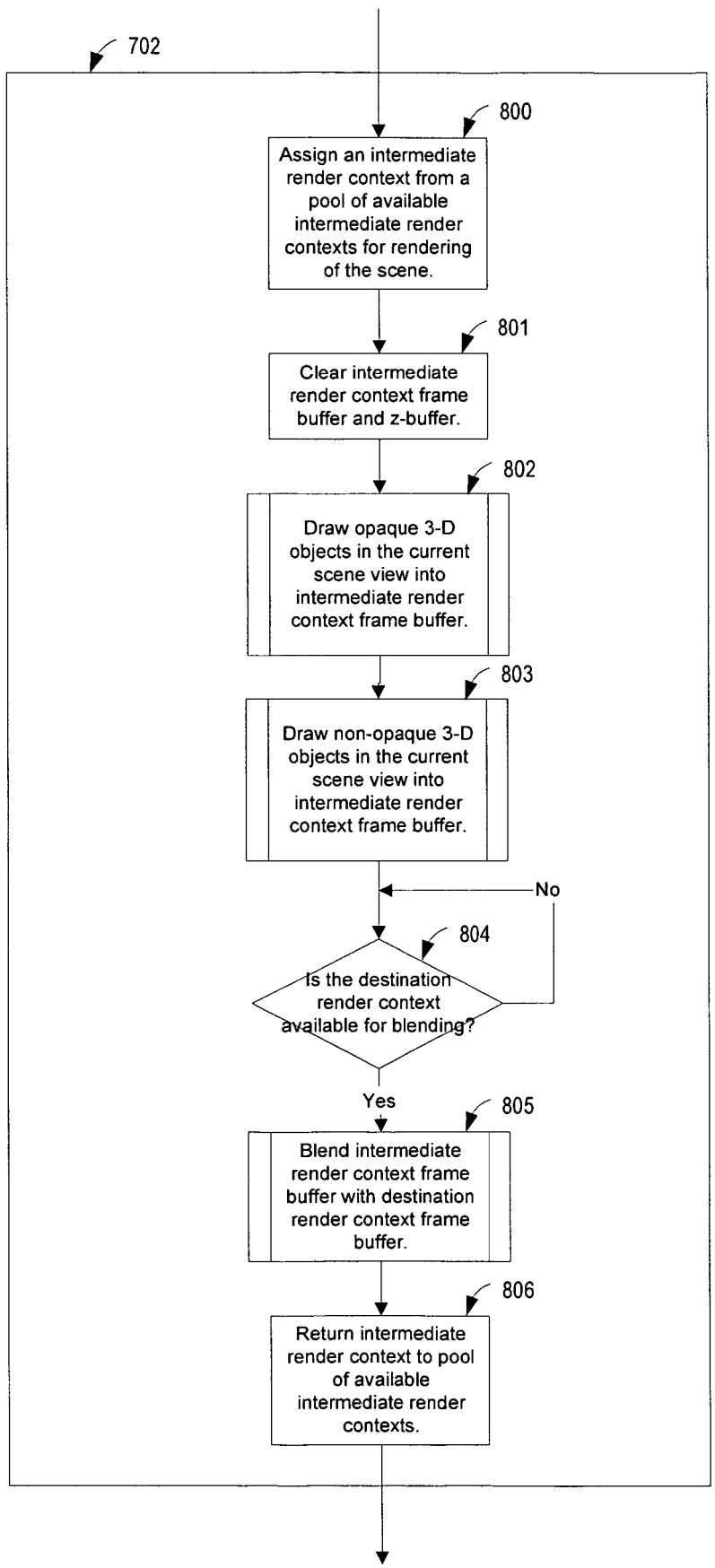
FIG. 8 is a flow chart describing the process of rendering an individual layer in accordance with a second exemplary preferred embodiment of the present invention.

FIG. 8 is a flowchart providing details of element 702 of FIG. 7 operable to render the present layer. Element 800 assigns an intermediate render context from a pool of available intermediate render contexts for the purposes of rendering the current layer. Element 801 then clears the assigned intermediate render context frame buffer and z-buffer for rendering. Element 802 then draws pixels for all fully opaque 3-D objects in the present 3-D scene view. Next, pixels of all non-opaque 3-D objects in the present 3-D scene view are drawn by element 803. Element 804 determines if the destination render context is available for blending. If not, element 804 waits until the destination render context is available. If so, element 805 then blends the intermediate render context frame buffer with the destination render context frame buffer. It should be noted that if FIG. 8 is being executed as a parallel process, the back-to-front layer composition ordering is preserved by element 804. For example, even if the front-most layer has been completely rendered into its assigned intermediate render context frame buffer, element 804 guarantees that this layer will not be blended into the destination render context frame buffer until all other rendered layers are blended into the destination render context frame buffer. Element 806 returns the intermediate render context to the pool of available intermediate render contexts, and the method completes. Further details of the operation of elements 802, 803, and 805 are provided below.

Figure 9:
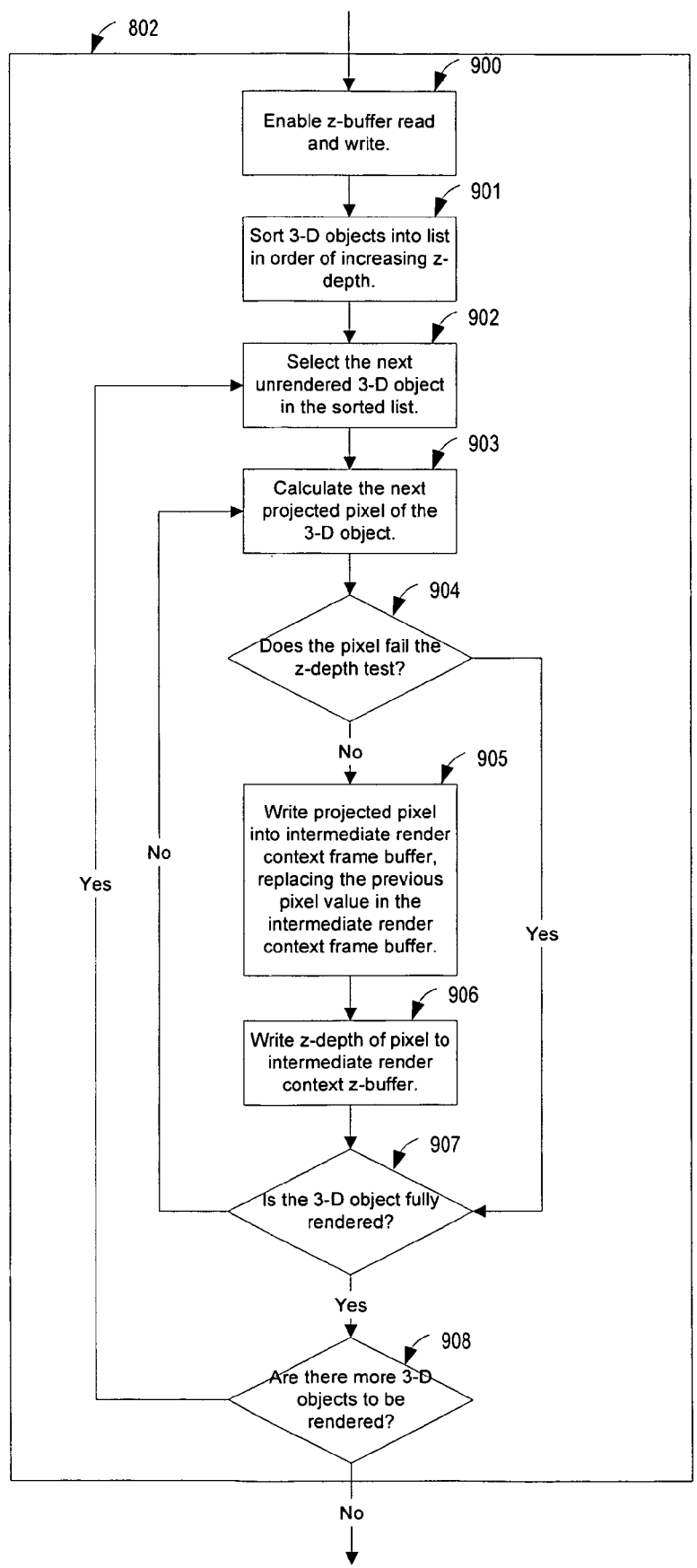
FIG. 9 is a flowchart describing the process of drawing the opaque 3-D objects that are found within a scene view in accordance with a second exemplary preferred embodiment of the present invention.

FIG. 9 is a flowchart providing details of element 802 of FIG. 8 operable to draw all of the opaque 3-D objects within the present 3-D scene view into the assigned intermediate render context. The processing of FIG. 9 is nearly identical to that of FIG. 4 with the only exception being that the opaque 3-D objects within the present scene view are rendered to the assigned intermediate render context in FIG. 9 instead of the destination render context as in FIG. 4.

Figure 10:
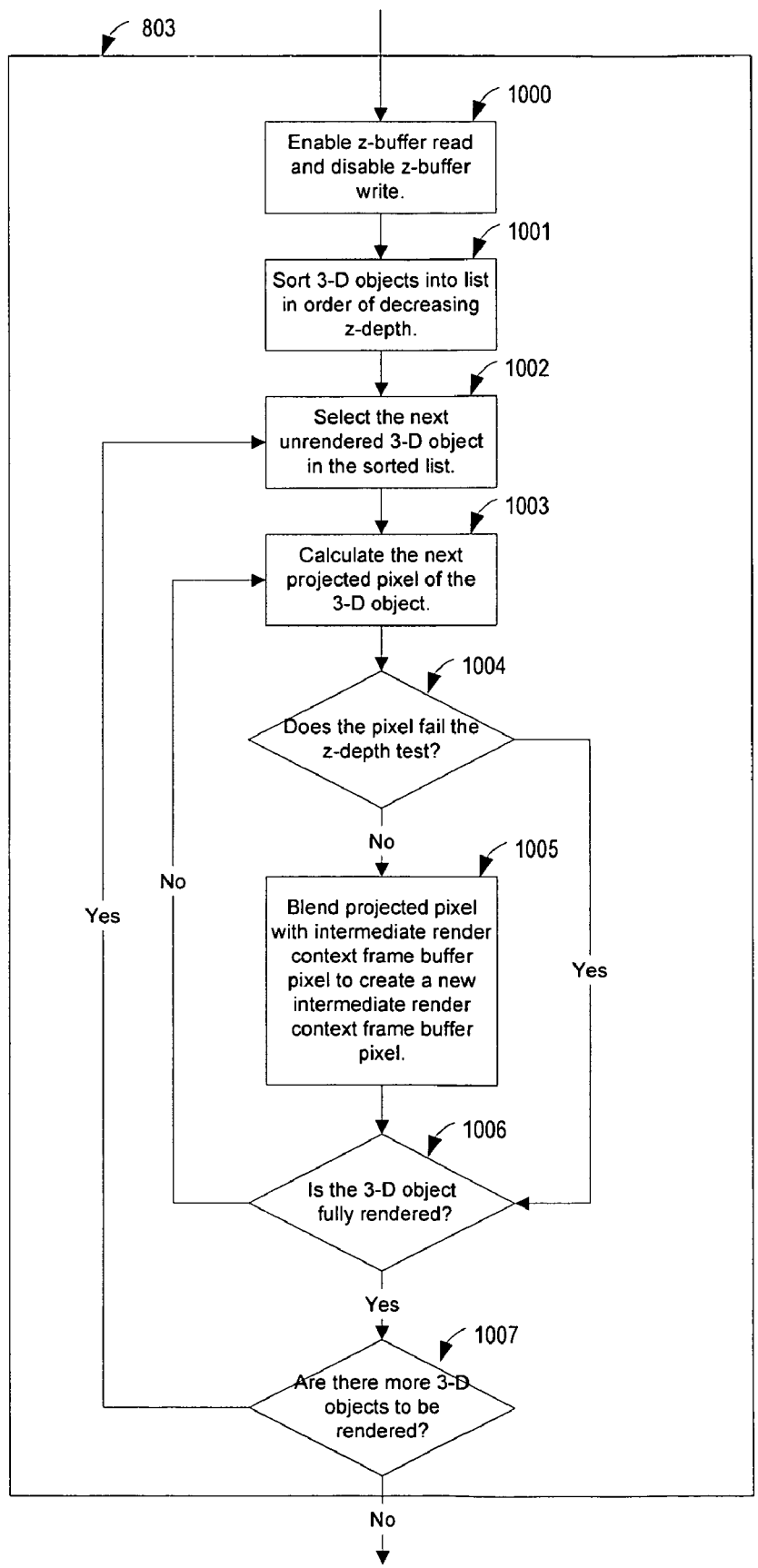
FIG. 10 is a flowchart describing the process of drawing the non-opaque 3-D objects that are found within a scene view in accordance with a second exemplary a preferred embodiment of the present invention.

FIG. 10 is a flowchart providing details of element 803 of FIG. 8 operable to draw all of the non-opaque 3-D objects within the present scene view into the assigned intermediate render context. The processing of FIG. 10 is nearly identical to that of FIG. 5 with the only exception being that the non-opaque 3-D objects within the present scene view are rendered to the assigned intermediate render context in FIG. 10 instead of the destination render context as in FIG. 5.

Figure 11:
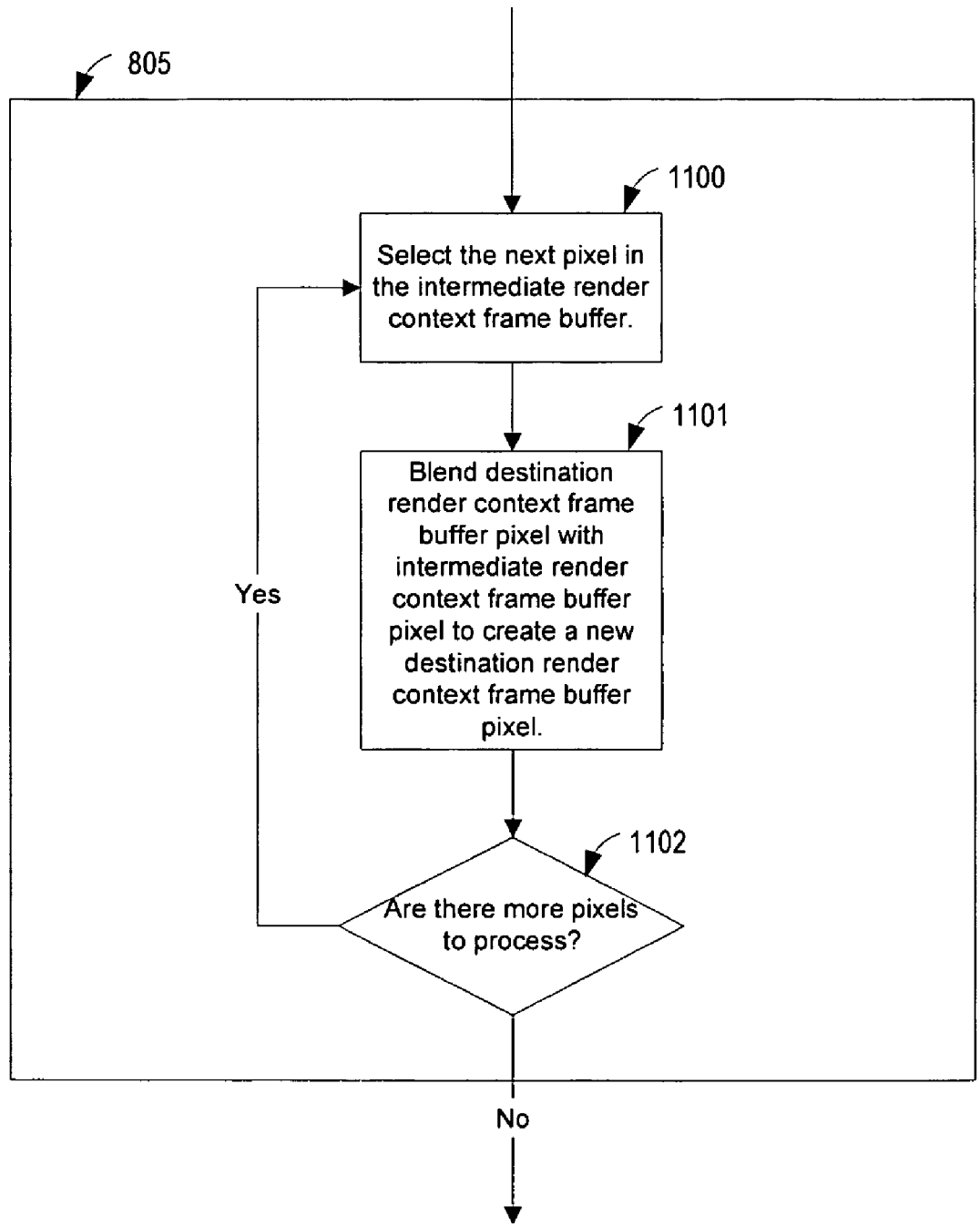
FIG. 11 is a flowchart describing the process of blending layers into a destination render context frame buffer in accordance with a second exemplary preferred embodiment of the present invention.

FIG. 11 is a flowchart providing details of element 805 of FIG. 8 operable to blend the assigned intermediate render context frame buffer with the destination render context frame buffer. Element 1100 selects the next (or first) pixel in the intermediate render context frame buffer for blending with the destination render context frame buffer. Element 1101 then performs the blending of the intermediate render context frame buffer pixel (that may include alpha information) with the existing destination render context frame buffer pixel (that may include alpha information) to create a new destination render context frame buffer pixel. As discussed above, the two pixels are blended or mathematically combined, according to an associated blend mode that is specified from the presentation data.

Those skilled in the art will recognize a wide variety of equivalent steps in the methods of FIGS. 3–5 and FIGS. 7–11 as well as a variety of equivalent sequences and ordering of the steps. Such design choices are well known to those of ordinary skill in the art. Further, those of ordinary skill in the art will recognize that the methods of the present invention may be implemented in custom circuits associated with a video display adapter as well as programmed instructions in a special or general-purpose processor.

While the invention has been illustrated and described in detail in the drawings and foregoing description, such illustration and description is to be considered as exemplary and not restrictive in character, it being understood that only the preferred embodiments and minor variants thereof have been shown and described and that all changes and modifications that come within the spirit of the invention are desired to be protected.

What is claimed is:

1. A system for creating a composite 2-D image for use in a real-time interactive multimedia presentation, said system comprising:
a display device operable to display said composite 2-D image;
presentation data, wherein said presentation data includes a 3-D scene and a plurality of 3-D scene views;
an input device operable to accept user input to modify said presentation data wherein the modifications to the presentation data includes modification to the graphical attributes of at least one of the plurality of 3-D scene views;
a frame buffer operable to store said composite 2-D image for display to said display device; and a rendering engine operable to derive 2-D image data from said plurality of 3-D scene views and operable to blend said 2-D image data to create said composite 2-D image stored in said frame buffer, wherein said system is operable to repeatedly create a sequence of composite 2-D images in real-time, at a rate of greater than or equal to 5 frames per second.

2. The system of claim 1 wherein said 3-D scene includes:
a 3-D object used by said rendering engine to calculate said 2-D image data from the perspective of a 3-D scene view of said plurality of 3-D scene views.

3. The system of claim 2 wherein said 2-D image data includes:
alpha information used by said rendering engine to blend said 2-D image data.

4. The system of claim 1 wherein said system further includes:
a plurality of layers that is created by said rendering engine from the perspective of said plurality of 3-D scene views,
wherein said rendering engine is operable to blend said plurality of layers into said composite 2-D image.

5. The system of claim 4 wherein said presentation data further includes:
an ordering of said plurality of 3-D scene views,
wherein said rendering engine is operable to blend said plurality of layers in accordance with said ordering of said plurality of 3-D scene views associated with said plurality of layers.

6. The system of claim 4 wherein said 3-D scene further includes:
a 3-D object used by said rendering engine to calculate said 2-D image data, wherein said 2-D image data composes a layer of said plurality of layers,
wherein said layer is calculated from the perspective of an associated 3-D scene view of said plurality of 3-D scene views.

7. The system of claim 4 wherein said 3-D scene further includes:
an opaque 3-D object used by said rendering engine to calculate said 2-D image data, wherein said 2-D image data composes a layer of said plurality of layers,
a non-opaque 3-D object used by said rendering engine to calculate said 2-D image data, wherein said 2-D image data composes said layer of said plurality of layers,
wherein said layer is calculated from the perspective of an associated 3-D scene view of said plurality of 3-D scene views.

8. The system of claim 4 wherein said system further includes:
an intermediate frame buffer operable for use by said rendering engine to temporarily store a calculated layer of said plurality of layers prior to blending with said 2-D image data contained within said frame buffer.

9. The system of claim 4 wherein a layer of said plurality of layers includes:
alpha information operable for use by said rendering engine to blend said layer into said composite 2-D image.

10. The system of claim 4 wherein said system further includes:
a z-buffer operable for use by said rendering engine for storing z-depth information associated with said 2-D image data, wherein said 2-D image data composes said layer of said plurality of layers,
wherein said z-depth information is used by said rendering engine to selectively render said 2-D image data, wherein said 2-D image data composes said layer of said plurality of layers, and
wherein said z-buffer is cleared prior to the calculation of said layer.

11. The system of claim 10 wherein said 3-D scene includes:
an opaque object that is rendered by said rendering engine from the perspective of a 3-D scene view of said plurality of 3-D scene views,
wherein said opaque object is selectively rendered according to the z-depths of said opaque object; and
a non-opaque object that is rendered by said rendering engine from the perspective of said 3-D scene view,
wherein said non-opaque object is selectively rendered according to the z-depths of said opaque object and said non-opaque object.

12. The system of claim 1 wherein said system further includes:
an intermediate frame buffer operable for use by said rendering engine for storing said 2-D image data derived from said plurality of 3-D scene views prior to blending with said 2-D image data contained within said frame buffer.

13. The system of claim 1 wherein said system further includes:
a z-buffer operable for use by said rendering engine for storing z-depth information associated with said 2-D image data that is rendered,
wherein said z-depth information is used by said rendering engine to selectively render said 2-D image data.

14. The system of claim 1 wherein said frame buffer is cleared prior to the creation of said composite 2-D image.

15. A computer operable method for image composition for use in a real-time interactive multimedia presentation, comprising the steps of:
blending 2-D image data derived from a plurality of 3-D scene views to generate a composite 2-D image wherein the 2-D image data is derived in accordance with associated presentation data;
receiving user input to modify said associated presentation data to alter the derivation of said 2-D image data wherein the modifications to the presentation data includes modification to the graphical attributes of at least one of the plurality of 3-D scene views;
presenting said composite 2-D image to a viewer; and
repeating the steps of blending, receiving, and presenting to present a sequence of composite 2-D images in real-time, at a rate of greater than or equal to 5 frames per second.

16. The method of claim 15 wherein said presentation data includes a predetermined ordering of said plurality of 3-D scene views and wherein the step of blending comprises the step of blending said 2-D image data in accordance with said predetermined ordering.

17. The method of claim 16 wherein said predetermined ordering is from back to front.

18. The method of claim 16 wherein the step of receiving user input to modify the presentation data includes the step of:
altering said ordering in response to the receipt of said user input.

19. The method of claim 15 wherein the step of blending includes the steps of:
a) rendering 2-D image data from a selected 3-D scene view of said plurality of 3-D scene views;
b) blending the rendered 2-D image data with said composite 2-D image;

c) repeating steps a) and b) to render and blend all 2-D image data from said selected 3-D scene view; and d) repeating steps a) through c) for each 3-D scene view of said plurality of 3-D scene views to generate said composite 2-D image.

20. The method of claim 19 wherein said 2-D image data includes pixel values and wherein the step of rendering includes the step of calculating said pixel values from said selected 3-D scene view, and wherein the step of blending said pixel values with said composite 2-D image is performed using an intermediate frame buffer.

21. The method of claim 20 wherein said composite 2-D image resides within a frame buffer.

22. The method of claim 19 wherein the steps of rendering and blending are performed substantially in parallel.

23. The method of claim 19 wherein said selected 3-D scene view is associated with a 3-D scene, and wherein said 3-D scene includes an object and wherein the step of rendering includes the step of:

calculating pixel values from said object contained within said 3-D scene from the perspective of said selected 3-D scene view.

24. The method of claim 23 wherein the step of calculating includes the step of:

selectively including said pixel values derived from said objects according to the z-depth of said objects.

25. The method of claim 23 wherein said pixel values include alpha information.

26. The method of claim 25 wherein said alpha information is associated with said object.

27. The method of claim 25 wherein said alpha information is associated with said presentation data.

28. The method of claim 19 wherein said composite 2-D image resides within a frame buffer and wherein the step of rendering further includes the step of:

clearing said frame buffer prior to performing steps a) and b) for a first selected 3-D scene view.

29. The method of claim 15 wherein the step of blending includes the steps of:

a) rendering 2-D image data from selected 3-D scene views of said plurality of scene views;

b) blending the rendered 2-D image data with said composite 2-D image;

c) repeating steps a) and b) for said plurality of 3-D scene views to generate said composite 2-D image.

30. The method of claim 29 wherein said 2-D image data includes pixel values, wherein the step of rendering includes the step of calculating said pixel values from said plurality of 3-D scene views, and wherein the step of blending said pixel values with said composite 2-D image is performed using an intermediate frame buffer.

31. The method of claim 30 wherein said composite 2-D image resides within a frame buffer.

32. The method of claim 29 wherein the steps of rendering and blending are performed substantially in parallel.

33. The method of claim 15 wherein said composite 2-D image resides within a frame buffer.

34. A computer readable storage medium tangibly embodying programmed instructions to perform a method for image composition for use in a real-time interactive multimedia presentation, said method comprising the steps of:

blending 2-D image data derived from a plurality of 3-D scene views to generate a composite 2-D image wherein the 2-D image data is derived in accordance with associated presentation data;

receiving user input to modify said associated presentation data to alter the derivation of said 2-D image data wherein the modifications to the associated presentation data includes modification to the graphical attributes of at least one of the plurality of 3-D scene views;

presenting said composite 2-D image to a viewer; and repeating the steps of blending, receiving, and presenting to present a sequence of composite 2-D images in real-time, at a rate of greater than or equal to 5 frames per second.

35. The storage medium of claim 34 wherein said presentation data includes a predetermined ordering of said plurality of 3-D scene views and wherein the method step of blending comprises the step of blending said 2-D image data in accordance with said predetermined ordering.

36. The storage medium of claim 35 wherein said predetermined ordering is from back to front.

37. The storage medium of claim 35 wherein the step of receiving user input to modify the presentation data includes:

altering said ordering in response to the receipt of said user input.

38. The storage medium of claim 34 wherein the method step of blending includes the steps of:

a) rendering 2-D image data from a selected 3-D scene view of said plurality of 3-D scene views;

b) blending the rendered 2-D image data with said composite 2-D image;

c) repeating steps a) and b) to render and blend all 2-D image data from said selected 3-D scene view; and d) repeating steps a) through c) for each 3-D scene view of said plurality of 3-D scene views to generate said composite 2-D image.

39. The storage medium of claim 38 wherein said 2-D image data includes pixel values and wherein the method step of rendering includes the step of calculating said pixel values from said selected 3-D scene view, and wherein the method step of blending said pixel values with said composite 2-D image is performed using an intermediate frame buffer.

40. The storage medium of claim 39 wherein said composite 2-D image resides within a frame buffer.

41. The storage medium of claim 38 wherein the method steps of rendering and blending are performed substantially in parallel.

42. The storage medium of claim 38 wherein said selected 3-D scene view is associated with a 3-D scene, and wherein said 3-D scene includes an object and wherein the method step of rendering includes the step of:

calculating pixel values from said object contained within said 3-D scene from the perspective of said selected 3-D scene view.

43. The storage medium of claim 42 wherein the method step of calculating includes the step of:

selectively including said pixel values derived from said objects according to the z-depth of said objects.

44. The storage medium of claim 42 wherein said pixel values include alpha information.

45. The storage medium of claim 44 wherein said alpha information is associated with said object.

46. The storage medium of claim 44 wherein said alpha information is associated with said presentation data.

47. The storage medium of claim 38 wherein said composite 2-D image resides within a frame buffer and wherein the method step of rendering further includes the step of:
   clearing said frame buffer prior to performing steps a) and b) for a first selected 3-D scene view.

48. The storage medium of claim 34 wherein the method step of blending includes the steps of:
   a) rendering 2-D image data from selected 3-D scene views of said plurality of 3-D scene views;
   b) blending the rendered 2-D image data with said composite 2-D image;
   c) repeating steps a) and b) for said plurality of 3-D scene views to generate said composite 2-D image.

49. The storage medium of claim 48 wherein said 2-D image data includes pixel values,
   wherein the method step of rendering includes the step of calculating said pixel values from said plurality of 3-D scene views, and
   wherein the method step of blending said pixel values with said composite 2-D image is performed using an intermediate frame buffer.

50. The storage medium of claim 49 wherein said composite 2-D image resides within a frame buffer.

51. The storage medium of claim 48 wherein the method steps of rendering and blending are performed substantially in parallel.

52. The storage medium of claim 34 wherein said composite 2-D image resides within a frame buffer.

* * * * *